S. D. FIELD.
DYNAMO REGULATOR.
APPLICATION FILED FEB. 14, 1908.

929,758.

Patented Aug. 3, 1909.

Witnesses:
H. L. Sprague
H. W. Bowen

Inventor,
Stephen Dudley Field.
by Chapin & Co,
Attorneys.

UNITED STATES PATENT OFFICE.

STEPHEN DUDLEY FIELD, OF STOCKBRIDGE, MASSACHUSETTS, ASSIGNOR TO PITTSFIELD SPARK COIL COMPANY, OF DALTON, MASSACHUSETTS, A CORPORATION.

DYNAMO-REGULATOR.

No. 929,758.   Specification of Letters Patent.   Patented Aug. 3, 1909.

Application filed February 14, 1908. Serial No. 415,859.

*To all whom it may concern:*

Be it known that I, STEPHEN DUDLEY FIELD, a citizen of the United States of America, residing at Stockbridge, in the county of Berkshire and State of Massachusetts, have invented new and useful Improvements in Dynamo-Regulators, of which the following is a specification.

The present invention relates to improvements in regulators for dynamos.

The invention is intended to overcome the derangement incident to widely varying speeds when attempts are made to adapt self-exciting dynamos to the various demands of automobile operations, as for instance, the use of a current in spark coils, charging of storage batteries, or train lighting. Without some means of accurately regulating the output of such machines it is practically impossible to use the currents therefrom for the purposes mentioned. The output of self-exciting dynamos as is well known varies directly as the speed of rotation, and this fluctuation in voltage and current can not be applied to the uses mentioned without some means of keeping the potential constant.

The object of this invention is to obtain uniform and steady operation when the current from the self-exciting dynamos is employed, and in order to obtain this result the invention consists, broadly, in associating with a self-exciting dynamo a device or apparatus which I term a "pulsating regulator" and also providing the limbs of the field magnet with a winding through which the current passes in a direction opposite to that of the ordinary field winding, whereby the fields are depolarized and the potential lowered thereby; and, further, in associating with the pulsator a storage battery which is fed from the dynamo when the voltage therefrom exceeds that of the storage battery; and, further, to instantly cut out the dynamo when its potential falls below that of the battery; and, further, to regulate the dynamo in such a manner that no abnormal potential will be generated even if the armature be rotated at an excessive speed.

In order to obtain the above results, it is necessary that frictionless moving parts and sparkless contacts be interposed in the controlling medium or "pulsating regulator" between the dynamo and the storage battery, as will be fully described in the specification and particularly pointed out in the claims.

Figure 1:
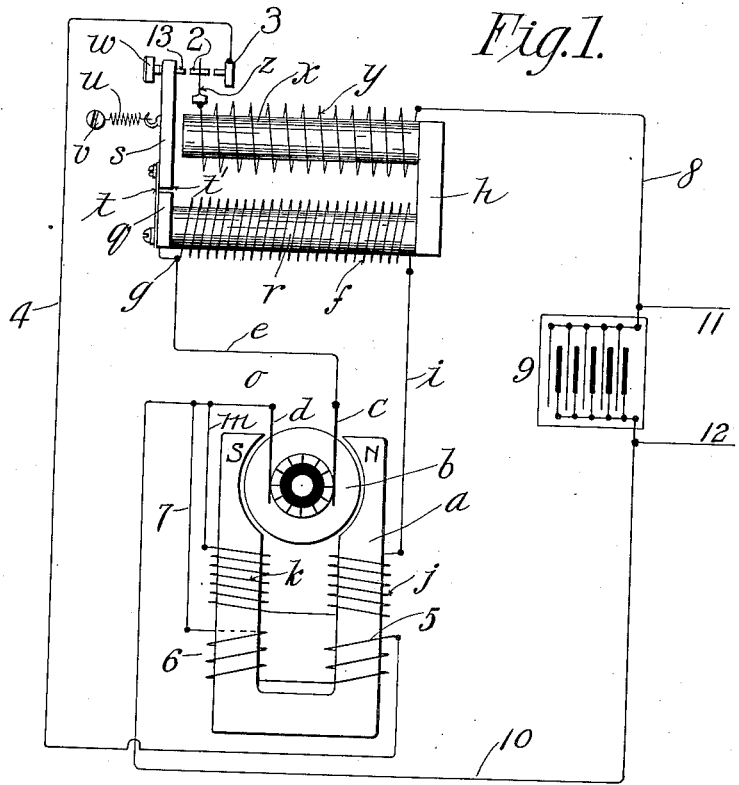
Figure 3:
Figure 2:
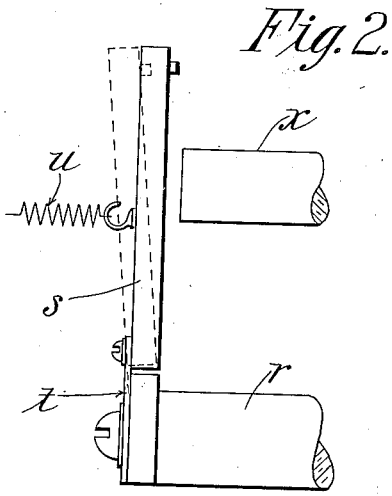

In the drawings forming part of this application,—Figure 1 is a diagram showing the various pieces of apparatus assembled and with the usual method of wiring. Fig. 2 is a side elevation of the armature portion of the "pulsating regulator" while Fig. 3 is an end elevation of Fig. 2.

Referring to the drawings in detail, $a$ designates the field magnets of the self-exciting dynamo, and $b$ the armature thereof, the brushes which bear upon the commutator bars being indicated by the letters $c$ and $d$. Leading from the brush $c$ is a wire $e$ which is connected to a winding or coil $f$ at the point $g$. This coil surrounds one of the limbs of the electromagnet $h$ and has its opposite terminal connected by the wire $i$ which leads back to the field windings $j$ and $k$ of the dynamo, which are connected by means of the wires $m$ and $o$ to the other commutator brush. The coil $f$ and the wires $e$ and $i$ may be considered as a part of the internal circuit of the dynamo, while the other wiring, (to be referred to,) as the external or working circuits.

$q$ designates a block that is secured to the limb $r$ of the electromagnet $h$ and has an armature $s$ that is attached thereto by means of the flat spring $t$. The armature is provided with a retractile spring $u$ that is attached to a fixed support $v$, as shown, and is normally drawn against a back-stop $w$.

$x$ designates the other limb of the electromagnet $h$ which is provided with a winding $y$ of fewer turns than the winding $f$. The terminals of this winding are connected at one end to a resilient tongue $z$ which carries a contact piece 2 which contact is located between the contact 13 on the armature $s$ and another stop 3, the latter being connected by means of the wire 4 to the differential or reversely wound coils 5 and 6 on the limb of the field magnet; which are connected by means of the wire 7 to the commutator brush $d$. The other terminal of the coil $y$ is connected, by means of the wire 8, to the positive terminal of the storage battery 9, and the other terminal of the storage battery is connected, by means of the return wire 10, to the commutator brush $d$.

The positive and negative terminals of the storage battery have connected thereto the wires 11 and 12 from which the current is taken to supply the spark-coils, or train lighting, or other ignition devices for which it may be required.

Referring now to the operation of my improved potential regulator: When the armature of the dynamo is rotated in the proper direction, the feeble current generated therein by reason of the windings of the armature cutting the feeble line of force due to residual magnetism in the poles N. and S. of the field magnet compound upon themselves in the usual way and flow from the brush $c$ through the wire $e$, coil $f$, and wire $i$ to the field coils $j$ and $k$, back to the negative terminal or brush $d$. This operation energizes the electromagnet $h$ of the pulsator and when the currents become sufficiently strong, the attractive force of the magnet $h$ will overcome the tension of the retractile spring $u$ and draw the armature so that the contact 13 will engage the contact 2 permitting the current to flow through the coil $y$ and wire 8 to the storage battery 9. The tension of the spring $u$ being adjusted to a tension so that it requires a greater electro-motive force than that of the storage battery to overcome its retractile pull, that is to say a current corresponding to eight volts, while the voltage of the storage battery 9 should be something less, as for example six volts. When the armature $s$, during its forward movement, closes the contacts 2 and 13, the greater part of the current from the dynamo will pass from the brush $c$ through said coil $y$ and into the storage battery 9, wire 10, back to the brush $d$, instead of flowing through the coil $f$ which contains a greater number of turns, and therefore of higher resistance. This movement of the armature $s$ causes practically all of the current from the dynamo to flow through the coil $y$ and into the storage battery 9, and very little to flow through the coil $f$ of the electromagnet $h$ and the field coils $j$ and $k$. This division of current now flowing through the coils $j$ and $k$ and the storage battery will cause a weakening of the current in the coils $j$ and $k$, and consequently a drop in voltage at the terminals of the armature by virtue of the lowering of the magnetic flux through the armature. This diminution of current consequently weakens the pull on the armature of the electro-magnet $h$. In order to compensate for this weakening effect on the electro-magnet $h$ by reason of the diminution of the current in the coil $f$, the coil $y$ is therefore provided in order to maintain a constant pull on the armature $s$ by effecting the constancy of magnetic flux in the electro-magnet $h$. As the current increases again the pull on the armature $s$ is increased until further movement of the armature will bring the contacts 2 and 3 together allowing a current to pass by the wire 4 to the reversely wound coils 5 and 6 on the field magnet $a$. The current through these coils exerts a depolarizing effect on the field magnet $a$ causing a diminution in the output of the armature $b$ and when the electro motive force from the machine is lowered and no longer equals that of the storage battery the electro-magnet $h$ will not hold the contacts 2 and 3 closed against the pull of the spring $u$. Consequently these contacts will separate thus cutting out the coils 5 and 6 and permitting the voltage to build up again at the armature terminals and repeat the cycle of operations. There will not be any spark at the break between the contacts 2 and 3 since the extra current or counter electromotive force from the coils 5 and 6 on the opening of the circuit through these coils will neutralize that from the storage battery; or, in other words, the counter electromotive force will extinguish its own spark. Contacts 2 and 3 will also, at their separation, be sparkless, as they will be of equal potential.

The field magnet $a$ is made large and is sluggish in action while the magnet $h$ acts with great rapidity with the following results: Assuming the cells of storage battery have a combined voltage of six volts and the spring $u$ is adjusted to require nine volts to cause sufficient current to pass through the coil $f$ to overcome its tension, it is clear that when the armature $s$ is attracted, there will be a surge or flow of current into the battery under a pressure of three volts. This current will slowly fade away in proportion to the sluggishness of the action of the field magnet $a$ when depolarized by the coils 5 and 6 until the electromotive force of the machine and battery are so nearly equal that the magnet $h$ will be weakened enough to permit the armature $s$ to fall off, cutting out the battery 9 and the coils 5 and 6, thus allowing the dynamo to build up again for another cycle of the above operations. The currents to be utilized for the spark coils or illumination are taken from the terminals 11 and 12. The spring suspension of the armature $s$, by means of the spring $t$ permits the maximum of flexibility and rigidity with the minimum of resistance, to the magnetic circuit. The space $t^1$ between the armature $s$ and the block $q$ is made very small, and I have found that one one-hundredth of an inch is sufficient. The blade-spring $z$ is very sensitive and when at rest holds the contact 2 midway between the points 3 and 13. It will thus be seen that a constant voltage is at all times maintained at the terminals of the storage battery 9 and that currents for any purpose whatever are taken from the lead wires 11 and 12 of the battery, as for example for uses in a spark-coil, train lighting, or other ignition devices.

What I claim, is:—

1. In combination with the armature of a self-excited dynamo, an electromagnet having a plurality of windings, a resiliently mounted armature therefor, a storage battery, a circuit extending between the armature and the battery, said circuit including a portion of the windings of the electromagnet and its armature, depolarizing coils on the filed magnet, and means actuated by the electro-magnet for cutting in and out said coils.

2. In combination with the field windings of a self-excited dynamo, an electromagnet of the horseshoe type, a coil of which is included in circuit with a portion of the field windings, a storage battery, the armature of said magnet being included in a connection between the dynamo brush and the battery when the battery is being charged, and an electrical connection between the battery and the armature of the dynamo, and a blade-spring included in the connection between the dynamo brush and the battery and adapted to be actuated by the armature of the electromagnet, and means to depolarize the field poles when a predetermined voltage is generated by the armature.

3. In combination with a field magnet and armature of a dynamo electric machine, field coils, an electromagnet, an armature therefor, the windings on one limb thereof being permanently included in series with the circuit of the field coils and armature circuit, the windings on the other limb of the electromagnet and its armature being included in an electrical connection extending from one terminal of the armature of the machine and one terminal of the windings on said first limb of the electromagnet, and constituting a part of the work circuit, a storage battery included in said connection and in series therewith, an electrical connection extending between the storage battery and the other terminal of the first mentioned armature, and resilient means associated with the armature of the electromagnet for permitting said first mentioned connection to close when a predetermined voltage occurs at the terminals of the first mentioned armature, and means to depolarize the field magnet when a predetermined voltage is generated by the dynamo.

4. In combination with a dynamo electric machine of the self-excited type, an electromagnet of the horseshoe type, a resiliently mounted armature therefor, the winding on one limb of the electromagnet being in series with a portion of the field winding of the dynamo, and the winding of the other limb of the electromagnet being included in the work circuit, said circuit extending from one terminal of the winding on the first limb to one terminal of a storage battery, said storage battery being connected across said work circuit, said work circuit also including the resiliently mounted armature of the electromagnet, and means for depolarizing the field magnet when the voltage at the terminals of storage battery exceeds a predetermined value.

5. In combination with a dynamo electric machine of the self-excited type, an electromagnet, a resiliently mounted armature therefor, the winding on one limb of the electromagnet being in series with a portion of the field winding of the dynamo, and the winding on the other limb of the magnet being included in a work circuit extending from said field winding, means associated with the armature of the electro-magnet for closing said connection when a predetermined voltage occurs at the dynamo terminals, and means for reducing the magnetic flux of the field magnet when the voltage at the brushes exceeds a certain value.

6. In combination with a shunt wound dynamo, an electro-magnet, an armature therefor, an external circuit connected to the dynamo terminals, a circuit in shunt thereto, depolarizing coils on the field of the dynamo and included in the shunt circuit, and means, actuated by the armature of the electromagnet, for causing a current to flow through the depolarizing coils.

7. In combination with a shunt wound dynamo, an electro-magnet, an armature therefor, a circuit in shunt to the dynamo terminals, depolarizing coils on the field of the dynamo and included in the shunt circuit, and means, actuated by the armature of the electromagnet for causing a current to flow through the depolarizing coils, a second circuit in shunt to the work circuit and including a coil of the electromagnet, a storage battery in the second circuit, said means also permitting a portion of the dynamo current to flow through the storage battery.

8. In combination with a self-excited dynamo electric machine, an electro-magnet provided with energizing coils, one coil thereof being included in series with some of the field coils and having a large number of turns, the other coil being in a work circuit connected thereto and having a smaller number of turns, the armature of said magnet being adapted to close the connection through said work circuit when a predetermined voltage occurs at the dynamo terminals, and a storage battery connected in said work circuit, depolarizing coils on the limbs of the field magnet, and means for closing the circuit of said coils and cutting in the work circuit when the voltage at the brushes exceeds a predetermined value.

9. In combination with a self-excited dynamo electric machine, an electromagnet provided with energizing coils, one coil thereof being included in some of the field winding circuits and having a large number of turns, the other coil being in a work circuit connected thereto and having a small number of turns, the armature of said magnet being adapted to close said circuit when a predetermined voltage occurs at the dynamo terminals, and a storage battery included in the work circuit, depolarizing coils on the field magnet of the dynamo, and means, operated by the armature of the electromagnet, for closing the work circuit through said depolarizing coils, whereby an abnormal current through the storage battery is prevented.

10. In combination with a storage battery, of means for charging the same and including a dynamo electro machine of the self-excited type, an electromagnet and its armature, a work circuit including the storage battery and a winding on the electromagnet in series with each other, means independent of the electromagnet for maintaining the work circuit in an open condition, and means including a blade-spring for closing the work circuit when the electromotive force of the dynamo becomes greater than the electromotive force of said battery, the spring being included in the storage battery circuit, and depolarizing coils in shunt to the battery circuit for controlling the movements of the armature of the electromagnet.

11. In combination with a storage battery, of means for charging the same and including a dynamo of the self-excited type, an electro-magnet and its armature, a circuit including the storage battery and a winding on the electromagnet, means independent of the action of the electromagnet for maintaining the circuit in an open condition, and means for effecting the closure of the circuit when the electromotive force of the dynamo becomes greater than the electromotive force of said battery, said means including a blade-spring, the spring being actuated by the armature of the electromagnet, and means for depolarizing the field of the dynamo when the magnetic flux of the electromagnet reaches a predetermined point.

12. In combination, a storage battery, a self-excited dynamo, electrical connections between the dynamo and battery, means included in the connections and adapted to operate to close the battery circuit when a predetermined voltage occurs at the dynamo terminals and to cut out the dynamo when the voltage of the dynamo and battery are equal, said means comprising an electromagnet and its armature, and a blade-spring for mounting the armature of said electro-magnet, and depolarizing coils on the field magnet for controlling the operation of the armature of the electromagnet.

13. In combination, a self-excited dynamo, differential windings on the field magnet thereof, an electro-magnet, a resiliently mounted armature therefor, a storage battery, electrical connections between said windings, resiliently mounted armature, and the battery, and means comprising a blade-spring, as $z$ interposed in said connections to regulate the flow of current through one of said windings, whereby the circuit between the dynamo and battery is alternately opened and closed, and whereby the flux of the field magnets are alternately increased and decreased.

14. In combination, a self-excited dynamo, differential windings on the field magnet thereof, a storage battery, electrical connections between the dynamo terminals and the battery and means interposed in said connections to regulate the flow of the current through one of said windings, whereby the circuit between the dynamo and battery is alternately opened and closed, and whereby the flux of the field magnets is alternately increased and decreased, said means including an electro-magnetic circuit breaker, the armature of which is adapted to close the circuit to the differential winding, and means comprising a blade-spring, as $z$, actuated by said armature for alternately cutting in and out the storage battery and one of the differential windings.

15. In combination, a self-excited dynamo, a storage battery, electrical connections between the terminals of the dynamo and the battery, an electromagnetic device included in said connections, a resiliently mounted armature therefor, and means, operated by said device, for opening and closing the circuit of the electromagnetic device, said means comprising a blade-spring actuated by the armature of the electro-magnetic device, a differential winding on the field magnet in shunt to the battery connections, and the flow of current through the windings being controlled by the blade-spring.

16. In combination, a self-excited dynamo, a storage battery, electrical connections between the terminals of the dynamo and the battery, an electromagnetic device included in said connections, and means operated by said device for energizing and deënergizing the electro magnetic device, said means including a resiliently mounted armature, and means, comprising a blade-spring and controlled by the armature for depolarizing the field magnets.

17. A voltage regulator for self-excited dynamo electric machines having in combination, a resiliently mounted armature, the mounting comprising a fixed element, a flat spring secured thereto and to the armature, and an electromagnet included in the external circuit for actuating the armature, a differential field winding, and means comprising a blade-spring actuated by the armature to close the circuit through the differential windings.

18. In combination, a self-excited dynamo, a differential field-winding therefor connected across the armature terminals, an electromagnet, a spring-blade actuated by the electro-magnet for closing the circuit through the differential winding, said spring-blade being connected to one terminal of a winding of the electromagnet, and a storage battery connected to the other terminal of the winding, and a connection between the storage battery and the armature, as described.

STEPHEN DUDLEY FIELD.

Witnesses:
 ADAM SCHILLING,
 GEO. SEYMOUR.